June 30, 1959  C. VAN DER LELY ET AL  2,892,299
TEDDERING DEVICE
Filed June 22, 1954  3 Sheets-Sheet 1
FIG: 1
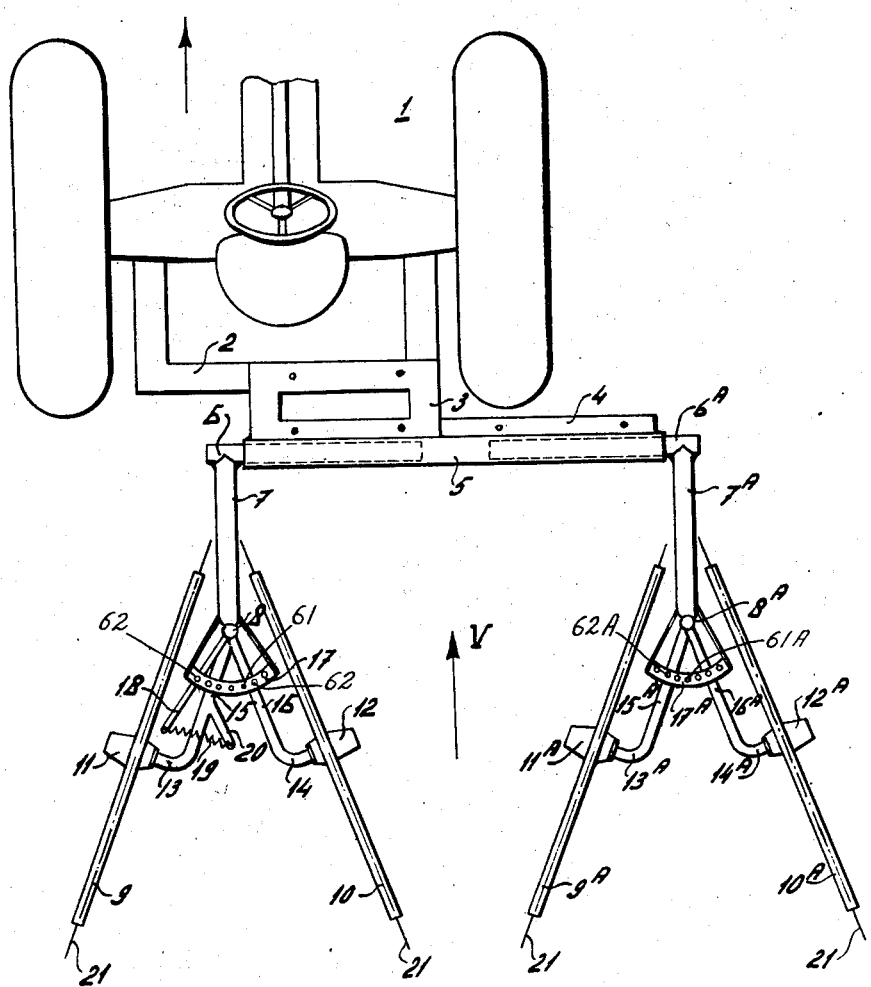

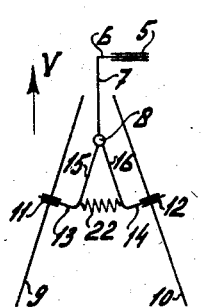
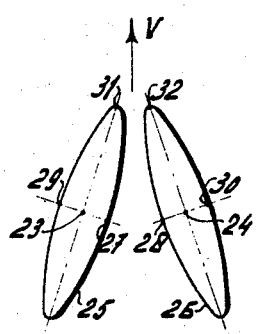
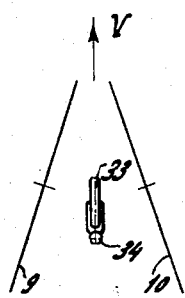
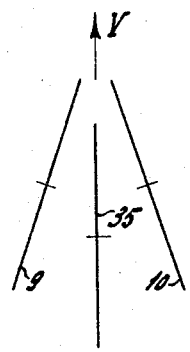
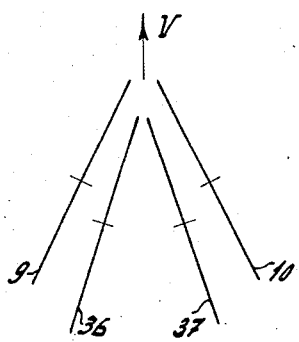

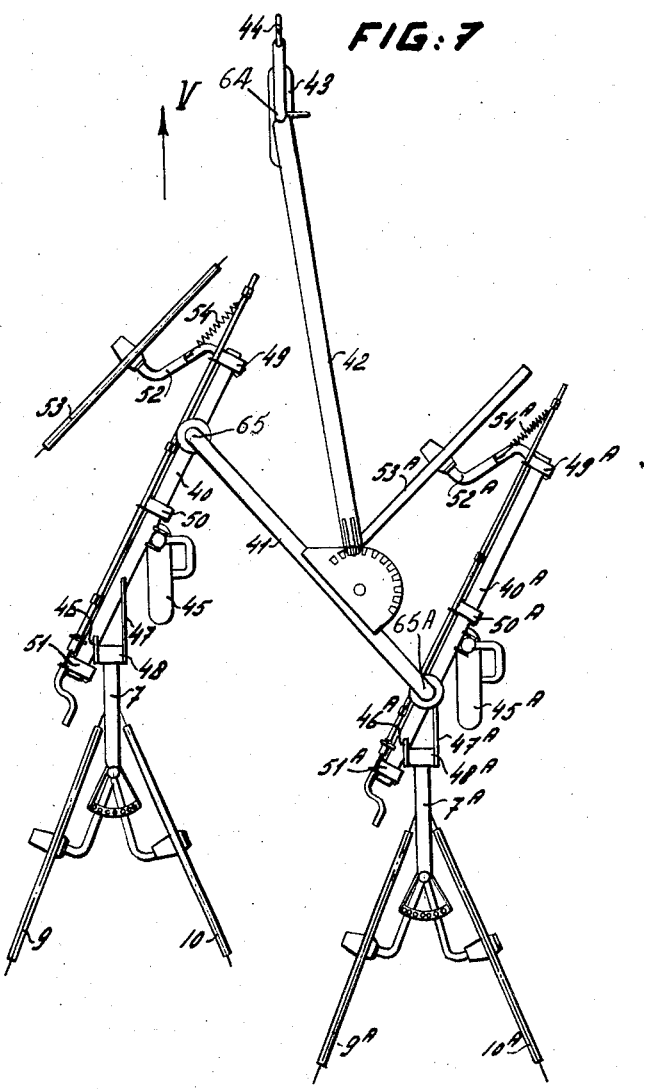

United States Patent Office 2,892,299
Patented June 30, 1959

2,892,299

TEDDERING DEVICE

Cornelis van der Lely and Ary van der Lely, Maasland, Netherlands, assignors to C. van der Lely N.V., a limited company of the Netherlands Application June 22, 1954, Serial No. 438,492

Claims priority, application Netherlands July 6, 1953

9 Claims. (Cl. 56—370)

This invention relates to agricultural devices, and more particularly to vehicular devices for treating swaths of hay, grass or like material by means of rake wheels.

Devices of the above-indicated kind are generally known for use as swath turners, side delivery rakes or tedders. Whereas rakes are used in hay harvesting after the crop has already been dried, swath turners are employed to turn over the material of a swath so as to cause the lowermost material to come to the top. By this operation the swath becomes rather compact, so that if weather conditions are poor, the interior of the swath may not dry sufficiently.

It is an object of the invention to provide means for treating a swath of crop and, more particularly, to treat a swath by pulling it apart so that its interior is exposed to air for rapid drying.

It is a further object of the invention to provide a device by means of which a swath can be treated in such a manner that the interior thereof will dry quickly.

According to an embodiment of the invention, two rake wheels are provided which are arranged in proximity to each other and mounted for rotation on respective axes in such a manner that, by their rotation during movement over a swath, said rake wheels will treat parts of the swath which are immediately adjacent to each other and will pull asunder the material in said parts in a direction transverse to the travelling direction of the composite device.

Further objects, features and details of the invention will appear in the following description with reference to the accompanying drawings in which some embodiments of the invention have been shown by way of example and in which:

Fig. 1 is a partial plan view of a tractor provided with devices according to the invention;

Fig. 2 is a diagrammatical view of the mounting of rake wheels in accordance with a further embodiment of the invention;

Fig. 3 diagrammatically illustrates a further embodiment of the invention;

Fig. 4 illustrates the disposition of a running wheel relative to rake wheels according to a variant of the aforegoing embodiments;

Fig. 5 illustrates the incorporation of an additional rake wheel;

Fig. 6 shows the use of two pairs of rake wheels in cooperative association; and Fig. 7 is a plan view of a swath turner which is adapted to be used as a side delivery rake and which is provided with devices according to the invention.

Referring to Fig. 1 of the drawings, the rear of a tractor 1 is provided wtih a frame 2 for the supporting of various implements behind the tractor. To this frame 2 is fixed by means of a connecting member 3 a beam 4 which is connected throughout its length to a tubular member 5 serving as a bearing for two shafts 6 and 6A. These shafts are independently rotatable in their bearings and are locked against lateral displacement in a conventional manner (not shown). To the said shafts 6 and 6A are secured arms 7 and 7A, respectively, the extremities of which are provided with pins 8 and 8A having vertical center lines.

Two rake wheels 9 and 10 are mounted with their hubs 11 and 12 on axles 13 and 14 having angular extensions 15 and 16 which are horizontal in the position shown and which are adapted to rotate individually about the pin 8. Likewise the rake wheels 9A and 10A are mounted with their hubs 11A and 12A on axles 13A and 14A having extensions 15A and 16A which are adapted to rotate about the pin 8A. Each of the said pairs of rake wheels constitutes a swath spreader according to the invention.

To the arms 7 and 7A are further secured segments 17 and 17A provided with openings 61 and 61A respectively. By means of pins 62 and 62A respectively passing through said openings, it is possible to secure the axles 15, 16, 15A and 16A in predetermined positions.

A yieldable mounting for the rake wheel 9 has been shown relative to the extension 15 of the axle 13. A strip 18 is rotatably mounted on the pin 8 and is secured in a predetermined position with regard to the segment 17. The free extremity of the strip 18 is connected by a draw spring 19 to a lateral arm 20 of the extension 15. Thus, the draw spring 19 tends to keep the rake wheel 9 in the position shown. However, if the forces acting upon said rake wheel (backwardly or laterally) in the direction of the rake wheel 10 become too great, the rake wheel 9 yields in a lateral direction, the plane of the rake wheel thereby making at the same time a smaller angle with the travelling direction indicated by the arrow V. It is useful to limit the extreme oblique position of the wheels and, to this end, use may be made of segments 17 and 17A.

The importance of the yielding function resides in the fact that the swath, over which the wheels 9 and 10 of the swath spreader move, may be in a very compact state. The lowermost teeth of the wheels 9 and 10 might then be strongly impeded in their rearwardly diverging movement whereby they stop rotating so that the material is pushed forward by the wheels. This is prevented when the rake wheels are allowed to move resiliently towards each other for, in this case, increasing resistance will only cause the wheels to become parallel to each other and there will be no blocking of the rotation of the wheels in the manner described. For the same reason it is advantageous to construct the wheels with resilient rims. The teeth 21 extending beyond the rims of the wheels are preferably directed, in the wheel plane, obliquely with regard to the radial direction so that at the rearmost parts of the wheels the teeth are directed downwardly whereby the material drops from the teeth.

In the embodiment shown diagrammatically in Fig. 2, the resilient positioning of the wheels is differently realized. In this figure, the details which are the same as those of Fig. 1 are illustrated diagrammatically but are identified with the same reference numerals. A compression spring 22, however, spaces the axles 13 and 14 and tends to maintain the most favorable angle between the planes of the rake wheels 9 and 10.

In another embodiment shown diagrammatically in Fig. 3, the axles 23 and 24 of the rake wheels 25 and 26 are inclined from a vertical plane in such a manner that the lowermost points 27 and 28 of said rake wheels are located nearer to each other than the uppermost points 29 and 30. This enables the parts of the rake wheels acting upon the material to be located nearer to each other than when the rake wheels are situated in vertical planes.

In Figs. 4 and 5, wheels 9 and 10 are mounted as shown in Fig. 1. As shown in Figs. 4 and 5, the above mentioned risk of having material carried along with the rake wheels in the travelling direction V, when said wheels are blocked from rotation, can be reduced by providing between the rake wheels 9 and 10 either a running wheel 33 in a fixed frame 34 (Fig. 4) or an additional rake wheel 35 (Fig. 5). The running wheel 33 and rake wheel 35 are mounted in conventional manner as shown in Pat. No. 2,592,270 and in Pat. No. 2,680,343. Since in these cases, the material between the rake wheels is pressed rather strongly against the ground, the raising of said material is prevented. The running wheel 33 also reduces the wheel pressure of the rake wheels upon the ground and the rake wheel 35 may have the same function.

Finally it is also possible to replace the rake wheel 35 (Fig. 5) by two rake wheels 36 and 37 as shown in Fig. 6, said rake wheels being located to the rear of rake wheels 9 and 10 and being mounted like wheels 9 and 10 to simulate the spreading effect provided by the wheels 9 and 10. Since the wheels 36 and 37 are less obliquely disposed than the wheels 9 and 10, they will only increase the required tractive power to a small degree.

When the device of Fig. 1 is in operation, the driver should steer the tractor in such a manner that the pairs of rake wheels 9 and 10 and 9A and 10A will move exactly over the middle of the swaths. Such particularity is not necessary in the device shown in Fig. 7. This device comprises a swath turner, the frame of which is formed by two beams 40 and 40A which are connected together by a bow or connecting bar 41. From an upper portion of the bow 41, an arm 42 extends forwardly to a position where it supports a running wheel 43 pivotable on a vertical axle 64 and a draw hook 44 defining the position of said running wheel. The beams 40 and 40A are supported by running wheels 45 and 45A which are both self-adjusting except that one can be fixed in predetermined position if desired. The beams 40 and 40A are hingedly connected to the bow 41 so as to be rotatable on vertical axles 65 and 65A respectively. Said beams may be conventionally fixed with regard to each other in the illustrated position, as well as in a position in which said beams 40 and 40A are in alignment. Each beam is provided with three overlapping rake wheels for use as a swath turner. If, however, the beams 40 and 40A are in alignment with arm 42 fixed in a suitable position with regard to the bow 41, the device can be used as a side delivery rake. Fig. 7 shows a third possibility for using the device. To this end the beam 40 or 40A is provided with rods 46 and 47 and 46A and 47A, respectively, through the ends of which a pin 48 or 48A can be inserted. Said pins serve as horizontal axes of rotation for the arms 7 and 7A carrying respectively the rake wheels 9 and 10 and 9A and 10A in the manner described with reference to Fig. 1.

On the beams 40 and 40A are respectively provided three bearings 49, 50 and 51 and 49A, 50A and 51A in which are mounted cranks, each carrying a rake wheel. According to Fig. 7, only two cranks are mounted (the cranks 52 and 52A mounted respectively in the bearings 49 and 49A for carrying rake wheels 53 and 53A). By means of springs 54 and 54A, respectively, the pressure of said wheels on the ground is reduced. The function of the rake wheels 53 and 53A is to set the swath in front of the pairs of rake wheels 9 and 10 and 9A and 10A, respectively, so that the place where the middle of the swath meets the rake wheels 53 and 53A may vary within certain limits whereby lesser demands are made as to the steering of the device.

The rake wheels 9, 10, 9A and 10A can be demounted from the device and the arms 7 and 7A with their accessories can also be demounted. The demounted rake wheels can be mounted on cranks of the same shape as cranks 52 and 52A and said cranks may be arranged in the bearings 50, 51, 50A and 51A, after which the swath spreader will be converted into a swath turned. This transformation, which may be also conversely effected, is very simple, so that for various types of implements only a small number of rake wheels is required. It will be evident that the swath spreader may be also combined with other implements provided with rake wheels, such as for example a tedder having a number of independently working rake wheels arranged obliquely with regard to the travelling direction.

What we claim is:

1. A moving device, having a normal travelling direction, for treating a swath of crop comprising a frame member, axles supported by said frame member, two rake wheels arranged in proximity to each other and mounted for rotation on said axles by contact with the ground, said axles diverging in the travelling direction of the device, the distance between each of the points of said rake wheels which are in contact with the ground being smaller than the distances of said points to the respective axes of rotation of the wheels so that by their rotation during moving over a swath said rake wheels treat parts of the swath which are immediately adjacent to each other and pull apart the material belonging to said parts in a direction transverse to the travelling direction.

2. A moving device, having a normal travelling direction, for treating a swath of crop comprising a frame member, axles supported by said frame member, two rake wheels arranged in proximity to each other and mounted for rotation on said axles, said axles diverging in the travelling direction of the device so that by their rotation during movement over a swath said rake wheels treat parts of the swath which are immediately adjacent to each other and therefore pull apart the material in said parts in a direction transverse to the travelling direction, the rake wheels defining axes inclined with respect to a horizontal plane, the lowermost points of the wheels being located nearer to each other than the uppermost points thereof.

3. A moving device, having a normal travelling direction, for treating a swath of crop comprising a frame member, axles supported by said frame member, two rake wheels arranged in proximity to each other and mounted for rotation on said axles, said axles diverging in the travelling direction of the device so that by their rotation during movement over a swath said rake wheels treat parts of the swath which are immediately adjacent to each other and therefore pull apart the material in said parts in a direction transverse to the travelling direction, and, between the said rake wheels, at least one other rake wheel operatively associated with said frame member for engaging the crop.

4. A moving device, having a normal travelling direction, for treating a swath of crop comprising a frame member, axles supported by said frame member, two rake wheels arranged in proximity to each other and mounted for rotation on said axles, said axles diverging in the travelling direction of the device so that by their rotation during movement over a swath said rake wheels treat parts of the swath which are immediately adjacent to each other and therefore pull apart the material in said parts in a direction transverse to the travelling direction, and, between the rake wheels, a running wheel operatively associated with said frame member.

5. A moving device, having a normal travelling direction, for treating a swath of crop comprising a frame member, axles supported by said frame member, two rake wheels arranged in proximity to each other and mounted for rotation on said axles, said axles diverging in the travelling direction of the device so that by their rotation during movement over a swath said rake wheels treat parts of the swath which are immediately adjacent to each other and therefore pull apart the material in said parts in a direction transverse to the travelling direction, and, in front of the said rake wheels, a raking device operatively associated with said frame member for directing the swath to the rake wheels.

6. A moving device, having a normal travelling direction, for treating a swath of crop comprising a frame member, axles supported by said frame member, two rake wheels arranged in proximity to each other and mounted for rotation on said axles, said axles diverging in the travelling direction of the device so that by their rotation during movement over a swath said rake wheels treat parts of the swath which are immediately adjacent to each other and therefore pull apart the material in said parts in a direction transverse to the travelling direction, the frame member comprising a horizontal hinge axle in front of the rake wheels about which the two rake wheels are simultaneously rotatable.

7. A moving device, having a normal travelling direction, for treating a swath of crop comprising a frame member, axles supported by said frame member, two rake wheels arranged in proximity to each other and mounted for rotation on said axles, said axles diverging in the travelling direction of the device so that by their rotation during movement over a swath said rake wheels treat parts of the swath which are immediately adjacent to each other and therefore pull apart the material in said parts in a direction transverse to the travelling direction, and a vertical axle operatively associated with said frame member and wherein at least one of the axles of the rake wheels is rotatable on said vertical axle.

8. A moving device, having a normal travelling direction, for treating a swath of crop comprising a frame member, axles supported by said frame member, two rake wheels arranged in proximity to each other and mounted for rotation on said axles, said axles diverging in the travelling direction of the device so that by their rotation during movement over a swath said rake wheels treat parts of the swath which are immediately adjacent to each other and therefore pull apart the material in said parts in a direction transverse to the travelling direction, and a vertical axle operatively associated with said frame member and wherein at least one of the axles of the rake wheels is rotatable on said vertical axle, said device further comprising resilient means for supporting at least one of the rake wheels yieldably relative to said vertical axle whereby the rake wheel yields to excessive loads.

9. A moving device, having a normal travelling direction, for treating a swath of crop comprising a frame, axles supported on said frame, a first group of two rake wheels arranged in proximity to each other and mounted for rotation on selected of said axles, the latter said axles diverging in the travelling direction of the device, a second group of two rake wheels, the wheels of said second group being arranged in proximity to each other and being mounted for rotation on further of said axles, said further axles diverging in the travelling direction of the device, said second group being spaced transverse to the travelling direction from said first group of rake wheels.

References Cited in the file of this patent
UNITED STATES PATENTS

| | | |
|---|---|---|
| 720,098 | Bamford | Feb. 10, 1903 |
| 740,911 | Peto | Oct. 6, 1903 |
| 2,592,270 | Getz | Apr. 8, 1952 |
| 2,603,053 | Lipe et al. | July 15, 1952 |
| 2,620,611 | Russell | Dec. 9, 1952 |